Sept. 27, 1966 D. S. STEVENS 3,275,834
APPARATUS FOR ANALYZING THE SIZE AND NUMBER
OF PARTICLES IN SUSPENSION
Filed April 1, 1963 2 Sheets-Sheet 1
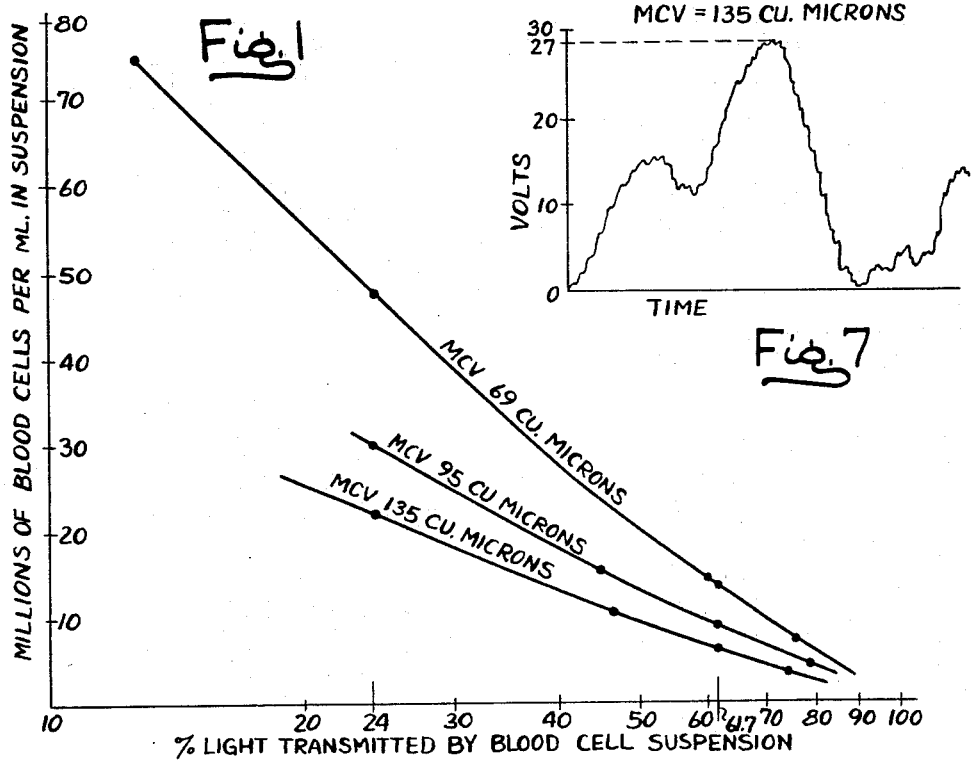
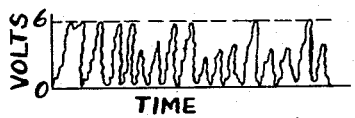
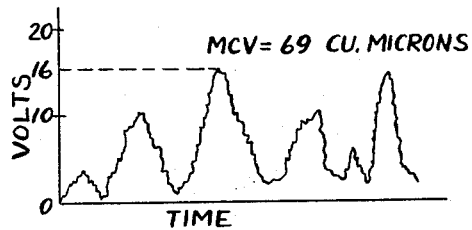
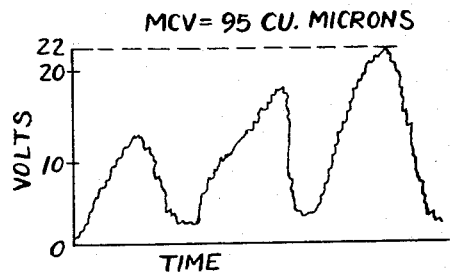
INVENTOR.
DANIEL S. STEVENS
BY
ATTY.

Sept. 27, 1966    D. S. STEVENS    3,275,834
APPARATUS FOR ANALYZING THE SIZE AND NUMBER
OF PARTICLES IN SUSPENSION
Filed April 1, 1963    2 Sheets-Sheet 2
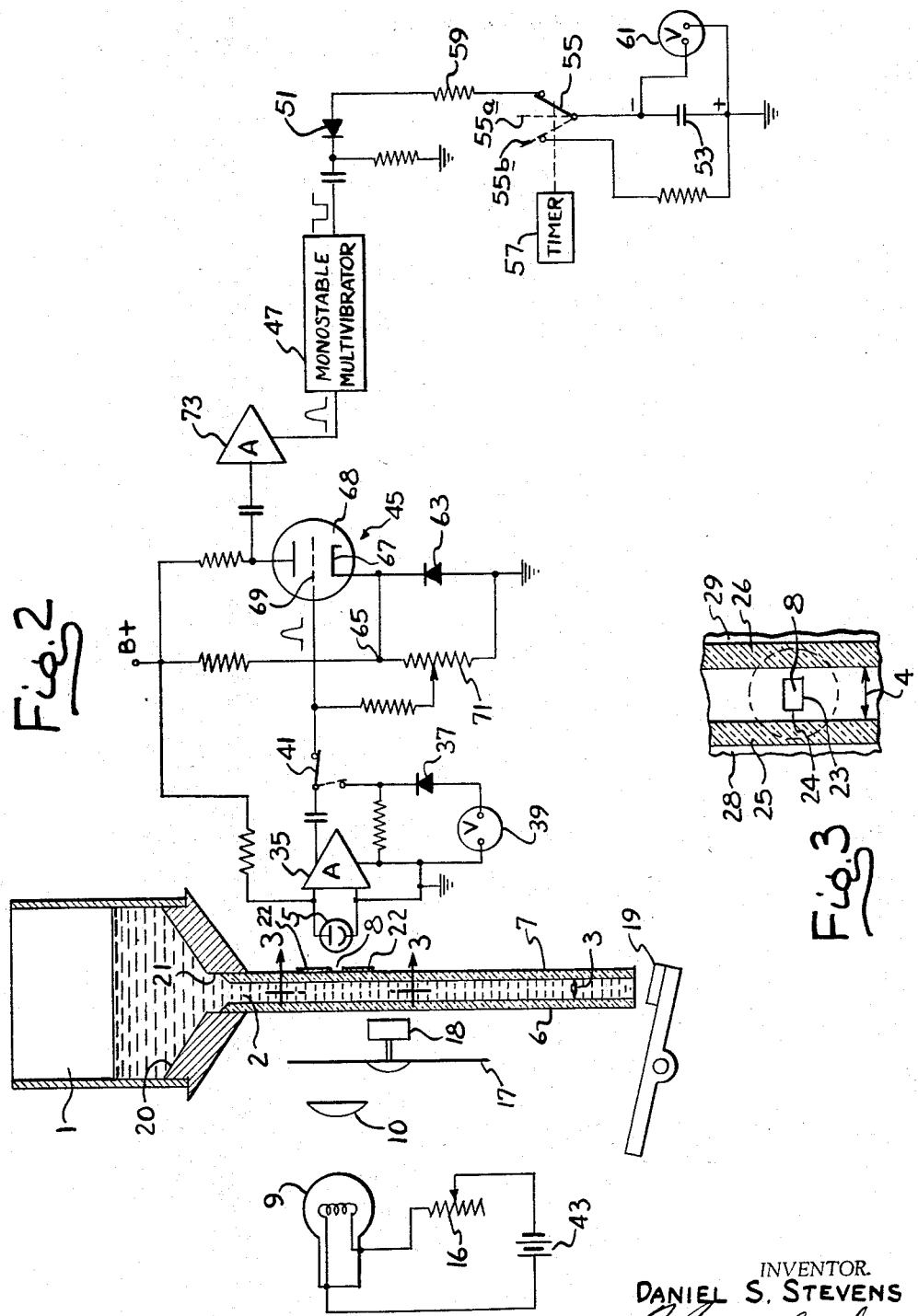
INVENTOR.
DANIEL S. STEVENS
BY
ATTY.

United States Patent Office 3,275,834
Patented Sept. 27, 1966

3,275,834
APPARATUS FOR ANALYZING THE SIZE AND NUMBER OF PARTICLES IN SUSPENSION
Daniel S. Stevens, 12099 County Line Road, Chicago, Ill.
Filed Apr. 1, 1963, Ser. No. 269,635
6 Claims. (Cl. 250—218)

This invention relates generally to a method and apparatus for analyzing the size and number of particles in suspension.

It is one of the objects of the present invention to provide an improved apparatus and method for readily determining the mean corpuscular volume of particles in suspension or for determining the number of particles per unit volume in the suspension.

It is a further object of the present invention to provide an improved method and apparatus of the type stated that is particularly useful for determining the mean corpuscular volume and cell count of red blood cell suspensions.

It is a further object of the present invention to provide an apparatus and method of the type stated in which the particles pass through a light beam to produce light pulses with intensities proportional to the volume of each particle producing a pulse, utilizing only those pulse portions above a pre-selected level to trigger a device that provides a constant energy output pulse, and integrating the constant energy ouput pulses with respect to time. The pre-selected triggering pulse magnitude is adjusted so that the integrated constant energy output pulses will indicate the average size of particles and also the number of particles per unit volume.

The apparatus has a passageway through which the particles flow. An aperture is adjacent to the passageway and the light beam is directed through the aperture. The aperture is of such size that the beam of energy traverses a volume of the passageway sufficient to permit the passage of clusters of particles at random orientations. Clusters of particles pulse the light beam, and the pulses above a preselected magnitude actuate a one-shot multivibrator. The pulses above said preselected magnitude result primarily from relatively large particles and clusters of particles while the pulses from individual small particles and circuit noise are below the preselected magnitude and, therefore, do not actuate the mutivibrator. The output of the multivibrator is integrated with respect to a selected time period to give a measure of the average size of the particles.

The attainment of the above and further objects of the present invention will be apparent from the following description taken in conjunction with the accompanying drawings forming a part thereof.

In the drawing:

FIG. 1 is a graph showing the relationship of cell count and transmittance for several values of means corpuscular volume (MCV) of blood cells;

FIG. 2 shows a view, partly in section, of a device that allows the flow of particle suspensions to pulse a light beam, and the schematic circuitry that forms part of the present invention;

FIG. 3 is a fragmentary sectional view taken along line 3—3 of FIG. 2 and illustrates the optical aperture in front of the photocell of the present invention;

FIG. 4 is a graph that shows the amplified noise output of the photocell; and

FIGS. 5, 6 and 7 are graphs showing the output of the photocell at the indicated values of MCV.

Several investigators have described the use of a photoelectric colorimeter or turbidimeter to determine the red blood cell count. Cf. L. L. Blum, Amer. Journ. of Clinical Pathology, vol. 23, pp. 798, 800, 1953. (Count is the number of blood cells, red or white, in one cubic millimeter of blood.) Precautions must be observed in using this technique. The reading of the instrument is determined both by the number and the average size (MCV) of the red blood cells in the suspension. If the instrument is calibrated for blood cells of normal MCV (90 cubic microns) a serious error will occur if the cell sample under test has an MCV of, for example, a small value (69 cubic microns) or a large MCV (135 cubic microns).

In a recommended procedure, the blood sample is diluted 200 times with Gower's solution and the percent transmittance of red light is read in a turbidimeter. By using blood samples of known count and known MCV, the curves of FIG. 1 are obtained. The three curves illustrate how the transmittance readings depend upon both the count and the MCV of the sample. The dilutions are read with red light because hemoglobin does not absorb red light and variations in hemoglobin content do not affect the readings. Gower's solution is 31 gms. anhydrous sodium sulfate, 83 ml. glacial acetic acid added to sufficient water to make 500 ml.

On reference to FIG. 1, the following values are obtained:

TABLE I

Percent transmittance 61.7

| MCV: | Concentration of blood cells |
|---|---|
| 135 | 6.7 million per ml. |
| 95 (sample a) | 9.5 million per ml. |
| 69 (sample b) | 13.7 million per ml. |

Although these three samples read the same in the turbidometer, on reading them in the device of my invention, properly set in a manner hereinafter described, different readings are obtained which can be considered as related either to the MCV or the concentration of cells in the sample.

To use this invention, a red blood cell suspension is prepared with a percent transmittance read in the turbidimeter and then the suspension is placed in the reservoir 1 shown in FIG. 2. The blood cell suspension then flows down into chamber 2. Chamber 2 has a dimension 3 of 100 microns, which causes the blood cells to flow in a thin stream as viewed by the active surface of photocell 5. Dimension 4 of chamber 2 is 5 millimeters, a distance sufficient to allow steady flow of the cell suspension through chamber 2.

Chamber 2 is fabricated from two pieces of clear glass, 6 and 7. Glass pieces 6 and 7 are separated by plastic spacers 25 and 26. These spacers have a thickness of 100 microns. The sides 28 and 29 of the chamber 2 are sealed in a liquid tight manner by a coating of silicone cement. Chamber 2 is held in a rectangular hole 21 of rubber fitting 20 with a liquid tight fit. Rubber fitting 20 also forms a liquid tight seal with glass reservoir 1.

Aperture 8 is formed by cementing thin brass plates 22 to the outside surface of glass plate 7. Before the cement hardens the plates can be located, with the aid of a measuring microscope, to form an aperture 8 having a width 23 of 80 microns and a height 24 of 40 microns. This aperture is strongly illuminated by light from lamp bulb 9, which is condensed by lens 10.

Blood cells in suspension flowing across aperture 8 absorb some of the light passing through the aperture 8, which causes pulses in the current of photocell 5. Photocell 5 is a conductive lead sulfide cell that is especially suited for my device because of its low noise output. The voltage pulses of photocell 5 are amplified approximately 5000 times by amplifier 35 that may be of conventional design.

The electronic circuit comprised of the photocell 5 and amplifier 35 is stable with respect to drift, but a means of easily standardizing this circuit with a source of pulses is preferably provided. This is accomplished by chopper 17 rotated by synchronous motor 18 to chop the light beam. The pulses appearing at the output of amplifier 35 are rectified by rectifier 37 and their D.C. voltage is read on voltmeter 39, when switch 41 is set in the broken line position shown.

The voltage across lamp bulb 5 provided by battery 43 is set at a proper value by rheostat 16 to give a reading of meter 39 which is called the calibration setting. This calibration setting is frequently checked after the flow of blood cells has been stopped by pressing soft rubber fitting 19 against the outlet of flow chamber 2.

The number of voltage pulses obtained from photocell 5 is related to the number of blood cells that pass across aperture 8. These pulses can be fed through a pulse magnitude selector circuit 45 that transmits only those photocell pulse portions above a preselected magnitude. Those pulse portions may be used to trigger a circuit known and described in the literature as a monostable (one-shot) multivibrator 47. This circuit operates in such a manner that an input voltage pulse above a certain level produces a constant energy output pulse, that is, an output pulse of definite voltage for a definite time regardless of the voltage of the input pulse above the triggering level. These output pulses pass through rectifier 51 and place a charge on capacitor 53 when switch 55 is placed in the full line position by a motor driven timer 57. High series resistance 59 allows only a small portion of the pulse voltage to appear across capacitor 53, so that the voltage obtained on the capacitor after many pulses is not sufficient to reduce the voltage obtained from succeeding pulses or it can be said that there is a substantially linear relation between the voltage across the capacitor 53 and the number of pulses producing it. The voltage increases across the capacitor 53 during the time the switch 55 is closed (full line position). At the end of a definite time the timer 57 opens the switch 55 (broken line position 55a), and the voltage is noted on a vacuum tube voltmeter 61 of high input resistance. In an alternative method of reading, the charge accumulated on the capacitor 53 can be discharged through a ballistic galvanometer and a note is made of the amount of maximum deflection. Either of these values can be used in the operation of the device of my invention.

Connecting switch 55 to ground (broken line position 55b) will discharge capacitor 53 and place it in a condition for repeated readings.

The blood cells have a widely dispersed, random distribution in the suspension. This causes the number of pulses obtained from the photocell 5 to vary considerably if readings are made for a short period of time, such as one second. If the period of time is lengthened the variations average to a value that is quite constant. A suitable time of integration for timer 57 is one minute which gives readings of the output meter 61 which agree in the range of two percent.

FIG. 4 shows the amplified noise output of the photocell 5, which is largely due to the flow of current through the photocell. The pattern is fine-grained with pulses of all heights ranging up to 6 volts.

FIG. 5 shows the pattern when red blood cells of MCV 69 flow through the chamber 2. The broad pulses are due to the blood cells, with the higher frequency noise pattern along the boundary of the oscilloscope trace. The pulse heights have all values, with a maximum of approximately 16 v.

FIG. 6 shows a similar pattern for a blood sample with an MCV 95. In this case a few of the pulses have heights of approximately 22 v.

FIG. 7 shows a pattern for a blood sample with an MCV 135. A few of the pulses have heights of approximately 27 v.

The pulses obtained are related to the number and orientation of the cells that flow across the aperture. The cells can have any random orientation and the average number opposite the aperture can be estimated as follows:

Volume opposite the aperture 8—$80 \times 40 \times 10$—320,000 microns.

For one of the samples listed—9.5 M cells per ml. of MCV 95

$$1 \text{ ml.} = 10^{12} \text{ microns}$$

$$\frac{9.5 \times 10^6}{10^{12}} \times .32 \times 10^6 = \text{approx. 3 cells}$$

The average number of cells opposite the aperture is 3 for this sample. However, the random distribution of the cells allows that at some instants there will be more than 3 cells present, and at other times less than three cells, even no cells, on occasion. The presence of multiple cells can be called clusters.

As will be explained, these random accumulations of cells aid in the operation of my device. The samples with the larger MCV's will have the higher maximum pulse heights as noted in FIGS. 5–7, because accumulations of large cells pulse the light beam more strongly. The higher pulse heights are an advantage because they are farther above the noise level of the circuit, and drift in either the noise or the circuit gain has less influence on the output signal.

The operation of the pulse magnitude selector 45 is as follows: zener diode 63 is always conducting because of its connection at point 65 to B+ and so maintains cathode 67 of tube 68 at a constant positive potential of 12 volts above ground. The potential of the grid 69 is negative with respect to the cathode 67 and the value of this potential can be varied by adjustment of potentiometer 71. Tube 63 may conveniently be of the high mu and triode type such as a 6AV6, and suitable adjustment of the potentiometer 71 provides a negative grid bias of approximately 5 volts, which holds the tube non-conducting except when positive pulses exceeding approximately 1 volt are applied to the grid 69. If switch 41 is now connected (full line position) to the grid 69 all positive pulses above approximately 1 v. will cause pulses in the plate current and these pulses will be transmitted to amplifier 73 of conventional design. Amplifier 73 raises the voltage of the pulses so that practically all of them will be above 10 v., the voltage required to trigger the monostable multivibrator 47.

With the pulse magnitude selector grid to cathode voltage set at a low value, −5 v., it was found that the voltage readings obtained across capacitor 53 were practically the same for all blood samples. Referring to FIG. 4 it is seen that the noise pulses range up to 6 v. and are very numerous. The pulses triggering the multivibrator 47 were largely due to the noise pattern and masked the pulses from the blood cells.

The bias was then raised to −8 v. When samples a and b of Table I were flowed through the chamber 2, it was found they gave the same value for the integrated voltage across capacitor 53, even though the concentration of cells in the samples was much different.

A digital counter connected across the output of the multivibrator 47 gives information on the number of pulses delivered to the capacitor 53. Under the conditions outlined for the aforementioned samples a and b, both delivered approximately 80 pulses per second to the capacitor 53. At this bias setting of the pulse selector 45 so many pulses of small voltage are rejected that the two samples read the same. This can be so, since the MCV 69 sample has many more cells, but they are of smaller size. This setting of the bias is not useful for the present purpose, since it is desired to distinguish all samples of blood cells.

The bias was then raised to a larger value of −12 v. At this value, only the strongest pulses could appear at the output of the multivibrator 47. At this bias the MCV 95 sample delivered approximately 12 pulses/sec., and MCV 69 sample 1.1 pulses/sec. to capacitor 53. The results shown in Table II below illustrate that blood samples having a wide range of cell concentrations and a wide range of MCV's can all be distinguished from one another.

TABLE II

| Percent Transmittance—61.7% | | Percent Transmittance—24% | | |
|---|---|---|---|---|
| Volts read across Cap. 53 in 1 min. | Conc. of Cells in Sample | Volts read across Cap. 53 in 1 min. | Conc. of Cells in Sample | MCV |
| .10 | 6.7 M/ml | .20 | 22 M/ml | 135 |
| .075 | 9.5 M/ml | .17 | 30 M/ml | 95 |
| .007 | 13.7 M/ml | .11 | 48 M/ml | 69 |

In using my device, a large set of tables could be made; each sheet would relate to a selected value of percent transmittance, and below would be volts ranging from below .007 to above 0.20. Each value of voltage would specify an MCV and a concentration of cells, the concentration being related to the count in the blood cell sample by a simple dilution factor.

In another method, the scale of the turbidimeter would be scaled for cell concentrations in terms of cells of normal size MCV 90. An unknown sample would then be diluted in a fixed manner and its apparent count read from the turbidimeter scale. All unknown samples would then be adjusted in cell concentration to an aribtrary value of transmittance. This adjusted sample would then be tested in my flow device. Voltmeter 61 could then be calibrated directly in MCV. If the MCV differed from 90, the apparent count could be corrected by applying a correction factor to give the true count.

By using cell concentrations much lower than those listed, my device would operate with essentially one cell in the aperture 8 at a time. It would be necessary to use a strong light source and an electronic circuit of very low noise to obtain satisfactory operation. The flow chamber of my device favors the presence of multiple cells more so than a capillary chamber, where the cells probably all flow down the axis due to the symmetry of forces with respect to the axis. Furthermore, the sample dimensions of my chamber allow one or more cells to be present in the direction of the light beam at an instant of time. Also, debris can catch at the top of the chamber without disturbing the flow pattern.

The random distribution of cells in the suspension causes more than the calculated average to be opposite the aperture 8 at one time and correspondingly fewer to be opposite latter on. This causes the presence of strong pulses which are useful in the operation of my device, as shown by the wide range of cell concentrations illustrated in Table II. The high bias on the grid 69 allows only the strongest pulses to pass and trigger the multivibrator 47 and these are more numerous in the samples with cells of large size, said samples all having the same percent transmittance.

The operation of my device with red blood cells illustrate principles which can be used for other cellular or granular materials that can be suspended in a liquid.

A relay can substitute for the multivibrator 47. The "pull-in" voltage of the relay corresponds to the triggering voltage of the multivibrator. A high voltage battery connected to the relay contacts gives pulses similar to the output of the multivibrator.

My device can be made very sensitive to the count and MCV of small size cells as indicated by Table II, for transmittance 61.7%.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and sought to be secured by Letters Patent is:

1. Apparatus for determining the average size of particles and the number of particles per unit volume in a suspension of such particles, said apparatus comprising means forming a passageway adapted to provide a flow of said suspended particles therethrough, means forming an aperture adjacent to the passageway, means providing a beam of energy directed through said passageway and aperture, the aperture being of such size that the beam of energy passing therethrough and through the passageway traverses a volume of the passageway that is of sufficient size to permit the passage of clusters of particles at random orientations which pulse said beam of energy such that the pulses are proportional to the volume of the particles flowing through the passageway, means converting the pulses into electrical pulses, pulse magnitude selector means receiving said electrical pulses and transmitting only those pulse portions above a preselected magnitude, the pulses above said preselected magnitude resulting from relatively large particles and clusters of particles and with pulses from individual small particles being below said preselected magnitude, means for producing a constant energy output pulse responsive to a pulse portion but irrespective of the magnitude thereof, and means for integrating said constant energy pulses with respect to a selected time period to determine the average rate of arrival of said constant energy pulses over said time period.

2. Apparatus for determining the average size of particles and the number of particles per unit volume in a suspension of such particles, said apparatus comprising means forming a passageway adapted to provide a flow of said suspended particles therethrough, means forming an aperture adjacent to the passageway, means providing a beam of energy directed through said passageway and aperture, the aperture being of such size that the beam of energy passing therethrough and through the passageway traverses a volume of the passageway that is of sufficient size to permit passage of clusters of particles at random orientations and which pulse said beam of energy such that the pulses are proportional to the volume of the particles flowing through the passageway, means converting the pulses into electrical pulses, pulse magnitude selector means receiving said electrical pulses and transmitting only those pulse portions above a preselected magnitude, said predetermined magnitude being such as to reject pulses due to noise and individual small particles, means for producing a constant energy output pulse responsive to a pulse portion but irrespective of the magnitude thereof, and means for integrating said constant energy pulses with respect to a selected time period, the pulse magnitude selector means being adjustable such that said transmitted pulse portions provide a predetermined relation between the integrated constant energy pulses and both the average size of the particles in said suspension and the number of particles per unit volume.

3. Apparatus according to claim 2 in which the integrating means includes a circuit having a capacitor and resistance means in series therewith, the capacitance being charged through said circuit by the constant energy pulse producing means, and the resistance means being of such magnitude that there is substantially a linear relationship betwen the voltage across the capacitor and the number of pulses producing said voltage.

4. Apparatus for determining the mean corpuscular volume of a suspension of particles of predetermined optical density comprising means forming a passageway adapted to provide flow of said particles in said suspension, means forming an aperture adjacent to the passageway, means forming a light beam directed transversely through said passageway and aperture, the aperture being of such size that the beam of light passing therethrough and through the passageway traverses a volume of the passageway that is of sufficient size to permit passage of clusters of particles at random orientations which pulse the light beam, photocell means converting said light pulses into electrical pulses, means for producing a constant energy output pulse responsive to a triggering input pulse above a predetermined magnitude, the pulses above said preselected magnitude resulting from relatively large particles and clusters of particles and with pulses from individual small particles being below said preselected magnitude, integrating means for receiving the constant energy output pulses and integrating those pulses with respect to a predetermined period of time, and circuit means for transmitting triggering pulses to said last-named means responsive to pulse portions from the photocell output that are above a preselected magnitude, said circuit means including means for adjusting said preselected magnitude to provide a predetermined relation between the integrated constant energy pulses and the mean corpuscular volume of the particles, whereby said integrated constant energy pulses indicate said mean corpuscular volume.

5. Apparatus for determining the average size of particles and the number of particles per unit volume in a suspension of such particles, said apparatus comprising means forming a chamber with transparent walls and entrance and exit openings, said chamber having a cross sectional area sufficient to provide flow of widely dispersed particles at random orientations and to permit the passage of clusters of particles, a light source and a photocell positioned respectively on opposite sides of said chamber whereby light rays from said light source pass through said particles to reach said photocell, means forming an aperture interposed in said light beam to restrict illumination to a volume of flowing suspension containing a limited number of said particles in which a cluster of particles is capable of pulsing the light beam, said chamber-forming means effecting substantially uniform flow of said particles to cause pulses in the output of said photocell that are proportional to the volume of the flowing particles, means for producing a constant energy output pulse responsive to a triggering input pulse above a predetermined magnitude, said predetermined magnitude being such as to reject pulses due to noise and individual small particles, an integrating circuit for receiving the constant energy output pulses and integrating those pulses with respect to a predetermined period of time, and circuit means for transmitting triggering pulses to said last-named means responsive to pulse portions from the photocell output that are above a preselected magnitude and that provide a predetermined relation between the integrated constant energy pulses and both the average size and the number of the particles per unit of volume.

6. Apparatus for determining the mean corpuscular volume and the number of particles per unit volume in a suspension of said particles, said apparatus means forming a chamber for said suspension having cross sectional dimensions such that the particles are substantially smaller than the volume of said chamber, a light source and a photoelectric device positioned respectively on opposite sides of the chamber, at least a part of the walls of the chamber being transparent to form a light transmitting path through the chamber, the light beam from said source passing through the chamber and striking said photoelectric device, means forming a light aperture that is interposed in the path of the light beam which passes through said chamber, which aperture is sized and located to provide a field spaced from both lateral edges of said chamber and to permit clusters of particles to pulse the light beam, a fluid reservoir positioned above said chamber and being in communication therewith whereby said particles in said suspension flow into said chamber and across said aperture to pulse said light beam creating electrical pulses in the output of said photoelectric device that are proportional to the volumes of the particles, pulse magnitude selector means receiving said electrical pulses and transmitting only those pulse portions above a preselected magnitude, said predetermined magnitude being such as to reject pulses due to noise and individual small particles, means for producing constant energy output pulses responsive to said pulse portions and irrespective of the magnitude thereof, and means for integrating said constant energy pulses with respect to a selected time period to determine the average rate of arrival of said constant energy pulses over said time period.

References Cited by the Examiner

UNITED STATES PATENTS

| | | | |
|---|---|---|---|
| 2,731,202 | 1/1956 | Pike. | |
| 2,850,239 | 9/1958 | Polanyi et al. | |
| 2,875,666 | 3/1959 | Parker et al. | 88—14 |
| 3,084,591 | 4/1963 | Stevens. | |
| 3,094,625 | 6/1963 | Hendrick | 250—222 |

FOREIGN PATENTS 1,227,526   8/1960   France.

RALPH G. NILSON, *Primary Examiner.*

J. D. WALL, *Assistant Examiner.*